(No Model.)
A. TSCHINKEL.
METHOD OF AND APPARATUS FOR ENGRAVING HOLLOW GLASSWARE.
No. 460,670. Patented Oct. 6, 1891.
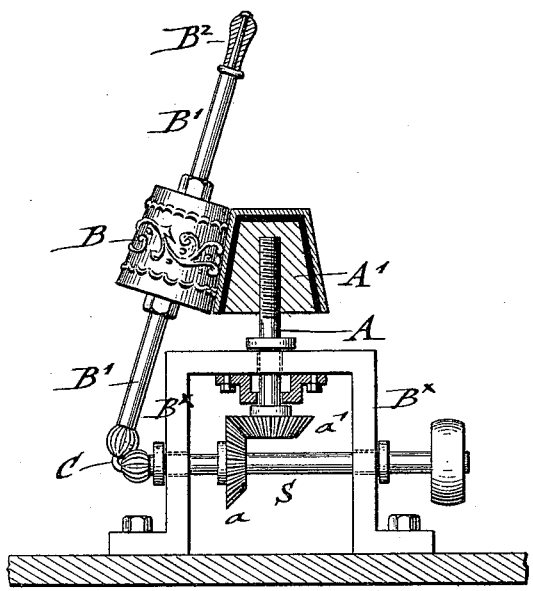
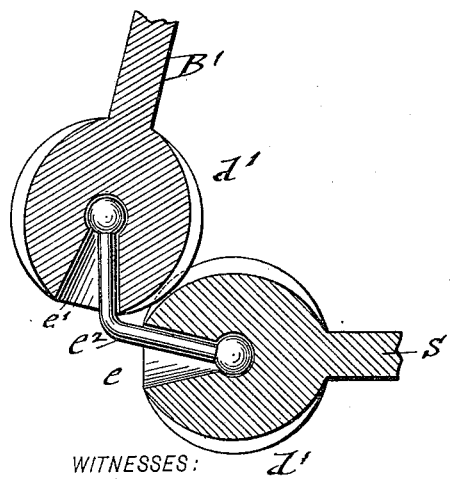
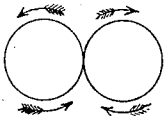
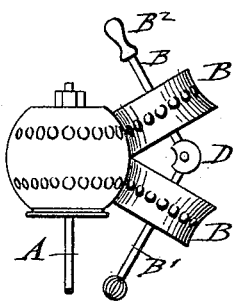
WITNESSES:
INVENTOR:
Alfred Tschinkel
BY
ATTORNEYS.

UNITED STATES PATENT OFFICE.

ALFRED TSCHINKEL, OF HOBOKEN, NEW JERSEY.

METHOD OF AND APPARATUS FOR ENGRAVING HOLLOW GLASSWARE.

SPECIFICATION forming part of Letters Patent No. 460,670, dated October 6, 1891.

Application filed December 19, 1890. Serial No. 375,248. (No model.)

*To all whom it may concern:*

Be it known that I, ALFRED TSCHINKEL, of Hoboken, Hudson county, and State of New Jersey, a citizen of the Empire of Austria-Hungary, have invented certain new and useful Improvements in Methods of and Apparatus for Engraving Hollow Glassware, of which the following is a specification.

This invention relates to an improved method and apparatus for engraving hollow glassware; and it consists, first, in subjecting a hollow article of glassware while being rotated on its axis to the abrading action of an engraving-die of corresponding shape that is rotated at the same speed but in opposite direction thereto, and retained in tangential contact with said article.

The machine consists, secondly, of a machine for engraving hollow glassware that comprises a rotary mandrel and head on which the hollow article of glassware is supported, and an engraving-die on which the ornaments are produced in relief, and which is rotated at the same speed but in opposite direction to said mandrel, and held in tangential contact with the article to be engraved, said engraving-die being removed from the article as soon as the ornamentation is completed.

In the accompanying drawings, Figure 1 represents a sectional side elevation of one form of machine by which the engraving of hollow glassware by my improved method is carried out. Fig. 2 is a diagram indicating the direction of rotation of the supporting-mandrel and the engraving-die. Fig. 3 is a detail vertical section, drawn on a larger scale, of one form of mechanism by which rotary motion is transmitted from the driving-shaft to the shaft of the engraving-die; and Fig. 4 is a side elevation of a machine adapted for engraving lamp-globes or similar articles of curved shape.

Similar letters of reference indicate corresponding parts.

Referring to the drawings, A represents a vertical mandrel, which is supported in bearings of a suitable frame $B^x$. The mandrel A is provided at its upper end with a head $A'$ of suitable yielding material, which corresponds to the shape of the hollow article to be engraved, and on which the tumbler or other article is placed in inverted position. The mandrel A is rotated from the driving-shaft S by means of bevel gear-wheels $a$ $a'$. Sidewise of the head $A'$ is arranged an engraving-die B, which is rigidly applied to a shaft $B'$, having a loosely-turning handle $B^2$ at the upper end. The engraving-die B is of the same shape and size as the article to be engraved and formed of an interior core and a suitable shell of emery composition, on which the ornamentation is produced in relief. The shaft $B'$, to which the engraving-die B is applied, is rotated at the same speed but in opposite direction as the article to be engraved, the rotary motion being imparted by any suitable transmitting-gear C, that shown in the drawings being composed of two spherical gear-wheels $d$ $d'$, one at the end of the shaft S and the other at the lower end of the shaft $B'$. The spherical gear-wheels $d$ $d'$ are provided, respectively, with a radial socket $e$ $e'$, into which are inserted the ends of an angular arm $e^2$, having ball-shaped ends, as shown clearly in Fig. 3. This transmission permits that simultaneously to the rotary motion an oscillating motion be given to the engraving-die, so that the same can be moved away from the article or toward the same for producing an abrading action thereon. Any other transmitting mechanism by which rotary motion in opposite direction to the mandrel is imparted may be used, as I do not confine myself to the special transmitting mechanism shown. For producing the ornamentation on an article of glassware the engraving-die is placed in tangential contact with said article, and as the latter, as well as the die, revolves simultaneously at the same speed and in opposite direction to each other the ornaments in relief on the die produce an abrading action on the circumference of the article, which is continued until the ornamentation is produced in a clear and well-defined manner thereon.

When the engraving of the article is completed, the engraving-die is quickly moved away from the article and the latter removed from the head and another placed in position thereon, which is then engraved in the same manner, and so on.

The engraving-die is preferably made of shell of a suitable emery composition, in which the ornamentation is produced by suitable molds. The shell is then baked in a suitable fire until hardened. When the relief ornamentation on the shell is worn out by use, another shell is placed in position on the core of the die B and the engraving action continued with the same. The die may, however, be made in any other suitable manner, provided that raised ornamentations are produced.

To produce the proper engraving action, two fundamental conditions are absolutely necessary: first, that the engraving-die be of the same size and shape as the article to be engraved; secondly, that the engraving-die be rotated at the same speed with the article to be engraved but in opposite direction thereto. Only when these conditions are complied with an effective engraving action can be produced on the circumference of the tumbler or other article of glassware. When glass globes or other curved hollow articles of glassware are to be engraved, the ornaments on the same are produced by means of two sectional dies B, which are connected by a universal coupling D, as shown in Fig. 4. In this case each half-die corresponds exactly to the shape and curvature of that portion of the globe that is to be engraved. Motion is transmitted to the shaft of the lower die B in the same manner as in Fig. 1.

By my improved method hollow articles of glassware can be engraved in a very quick and effective manner, as only a few rotations of the article in contact with the die are required to produce the clear engraving on the surface of the article. Tumblers and other hollow articles of glassware can thus be ornamented at a very small expense and their appearance improved thereby in a high degree.

Having thus described my invention, I claim as new and desire to secure by Letters Patent—

1. The method herein described of engraving hollow articles of glassware, which consists in imparting to said articles a rotary motion on their axis and subjecting the same simultaneously to the action of an engraving-die of the same shape and size, which is rotated at the same speed but in opposite direction to the article of glassware and held in tangential contact therewith, substantially as set forth.

2. A machine for engraving hollow glassware, which consists of a rotary mandrel having a head for supporting the hollow article, an engraving-die of the same size and shape as the article to be engraved, said die being provided with ornamentations in relief, and a rotary shaft to which said die is applied, substantially as set forth.

3. A machine for engraving hollow glassware, which consists of a mandrel having a head for the hollow article, an engraving-die of the same size and shape as the article to be engraved and provided with raised ornamentations, a shaft to which the die is attached, and a transmitting mechanism between the driving-shaft of mandrel and die-supporting shaft by which rotary motion is imparted to the die at the same speed but in opposite direction to the article on the mandrel, substantially as set forth.

In testimony that I claim the foregoing as my invention I have signed my name in presence of two subscribing witnesses.

ALFRED TSCHINKEL.

Witnesses:
PAUL GOEPEL,
MARTIN PETRY.